(12) United States Patent
Arbel et al.

(10) Patent No.: US 12,505,613 B2
(45) Date of Patent: Dec. 23, 2025

(54) SYSTEMS AND METHODS FOR ASSESSING PARTIAL IMPULSIVITY IN VIRTUAL OR AUGMENTED REALITY

(71) Applicant: XR Health IL LTD, Tel Aviv (IL)

(72) Inventors: Tal Arbel, Hod-Hasharon (IL); Ido May-Raz, Tel Aviv (IL)

(73) Assignee: XR Health IL LTD, Tel Aviv (IL)

( * ) Notice: Subject to any disclaimer, the term of this patent is extended or adjusted under 35 U.S.C. 154(b) by 192 days.

(21) Appl. No.: 18/228,438

(22) Filed: Jul. 31, 2023

(65) Prior Publication Data

US 2024/0203048 A1 Jun. 20, 2024

Related U.S. Application Data

(63) Continuation of application No. PCT/IB2022/000039, filed on Jan. 28, 2022.

(60) Provisional application No. 63/143,544, filed on Jan. 29, 2021.

(51) Int. Cl.
*G06T 17/00* (2006.01)
*G06F 3/01* (2006.01)

(52) U.S. Cl.
CPC .............. *G06T 17/00* (2013.01); *G06F 3/013* (2013.01)

(58) Field of Classification Search
CPC .......... G06T 17/00; G06F 3/013; G06F 3/011; G06F 3/015; G06F 3/0346; A61B 3/112; A61B 5/11; A61B 5/163; A61B 5/6803; A61B 5/162; A61B 3/113
See application file for complete search history.

(56) References Cited

U.S. PATENT DOCUMENTS

| | | | |
|---|---|---|---|
| 11,033,453 B1 * | 6/2021 | Berme | G09B 19/00 |
| 2012/0293773 A1 | 11/2012 | Publicover et al. | |
| 2015/0242642 A1 | 8/2015 | Jayaprakash et al. | |
| 2016/0262608 A1 * | 9/2016 | Krueger | G16H 40/63 |
| 2020/0192478 A1 | 6/2020 | Alcaide et al. | |
| 2020/0337653 A1 * | 10/2020 | Alcaide | A61B 5/369 |

FOREIGN PATENT DOCUMENTS

WO   WO-2022/162469 A1   8/2022

OTHER PUBLICATIONS

International Search Report and Written Opinion for International Application No. PCT/IB2022/000039 dated Jun. 19, 2022.

* cited by examiner

*Primary Examiner* — Chong Wu
(74) *Attorney, Agent, or Firm* — GREENBERG TRAURIG, LLP (57) ABSTRACT

Provided herein are systems, methods, and computer program products for determining partial impulsivity of a user of a virtual or augmented reality system. A virtual environment having a plurality of targets is provided. A visual stimulus is provided at a target. A first period of time from when the first visual stimulus is provided to when a user fixates on the visual stimulus, a first acceleration of the body part, a second period of time from when the first visual stimulus is provided to when the first acceleration occurs, a second acceleration (deceleration) of the body part, a third period of time from when the first acceleration occurs to when the velocity of the body part is zero is determined, a total fixation time on the visual stimulus, a total number of impulsive movements in a session, and an impulsivity score are determined.

10 Claims, 6 Drawing Sheets

SYSTEMS AND METHODS FOR ASSESSING PARTIAL IMPULSIVITY IN VIRTUAL OR AUGMENTED REALITY

CROSS-REFERENCE TO RELATED APPLICATION

This application is a Bypass Continuation of International Patent Application PCT/IB2022/000039, filed on Jan. 28, 2022, which claims the benefit of U.S. Provisional Application No. 63/143,544, filed on Jan. 29, 2021. Each of these applications are hereby incorporated by reference in their entirety herein.

BACKGROUND

Embodiments of the present disclosure relate to assessing partial impulsivity in virtual reality (VR) or augmented reality (AR).

BRIEF SUMMARY

Systems, methods, and computer program products are provided for determining partial impulsivity of a user. In various embodiments, a method is provided where a virtual environment is provided to a first user via a virtual or augmented reality system. The virtual environment includes a plurality of targets. A plurality of visual stimuli are provided at one of the plurality of targets. The plurality of visual stimuli are provided sequentially and collectively defining a session. For each of the plurality of visual stimuli, a first period of time is determined from when the first visual stimulus is provided to when a user fixates one or both eyes on the one of the plurality of targets having the first visual stimulus. A first acceleration of the body part is determined. The first acceleration causes a velocity of the body part to increase in the direction of the one of the plurality of targets. A second period of time is determined from when the first visual stimulus is provided to when the first acceleration is determined. A second acceleration of the body part is determined. The second acceleration causes the velocity of the body part to decrease to zero prior to contacting the one of the plurality of targets. A third period of time is determined from when the first acceleration is determined to when the velocity of the body part is zero. A total fixation time on the one of the plurality of targets is determined after the visual stimulus is provided. A total number of impulsive movements in the session is determined. An impulsivity score is determined based on the first period of time, total fixation time, total number of impulsive movements, second period of time, and third period of time.

In various embodiments, a system includes a virtual or augmented reality system having a virtual or augmented reality display adapted to display a virtual environment to a user, an eye tracking device, and a computing node comprising a computer readable storage medium having program instructions embodied therewith. The program instructions are executable by a processor of the computing node to cause the processor to perform a method where a virtual environment is provided to a first user via a virtual or augmented reality system. The virtual environment includes a plurality of targets. A plurality of visual stimuli are provided at one of the plurality of targets. The plurality of visual stimuli are provided sequentially and collectively defining a session. For each of the plurality of visual stimuli, a first period of time is determined from when the first visual stimulus is provided to when a user fixates one or both eyes on the one of the plurality of targets having the first visual stimulus. A first acceleration of the body part is determined. The first acceleration causes a velocity of the body part to increase in the direction of the one of the plurality of targets. A second period of time is determined from when the first visual stimulus is provided to when the first acceleration is determined. A second acceleration of the body part is determined. The second acceleration causes the velocity of the body part to decrease to zero prior to contacting the one of the plurality of targets. A third period of time is determined from when the first acceleration is determined to when the velocity of the body part is zero. A total fixation time on the one of the plurality of targets is determined after the visual stimulus is provided. A total number of impulsive movements in the session is determined. An impulsivity score is determined based on the first period of time, total fixation time, total number of impulsive movements, second period of time, and third period of time.

In various embodiments, a computer program product for determining partial impulsivity of a user includes a computer readable storage medium having program instructions embodied therewith. The program instructions are executable by a processor of the computing node to cause the processor to perform a method where a virtual environment is provided to a first user via a virtual or augmented reality system. The virtual environment includes a plurality of targets. A plurality of visual stimuli are provided at one of the plurality of targets. The plurality of visual stimuli are provided sequentially and collectively defining a session. For each of the plurality of visual stimuli, a first period of time is determined from when the first visual stimulus is provided to when a user fixates one or both eyes on the one of the plurality of targets having the first visual stimulus. A first acceleration of the body part is determined. The first acceleration causes a velocity of the body part to increase in the direction of the one of the plurality of targets. A second period of time is determined from when the first visual stimulus is provided to when the first acceleration is determined. A second acceleration of the body part is determined. The second acceleration causes the velocity of the body part to decrease to zero prior to contacting the one of the plurality of targets. A third period of time is determined from when the first acceleration is determined to when the velocity of the body part is zero. A total fixation time on the one of the plurality of targets is determined after the visual stimulus is provided. A total number of impulsive movements in the session is determined. An impulsivity score is determined based on the first period of time, total fixation time, total number of impulsive movements, second period of time, and third period of time.

DETAILED DESCRIPTION

Impulsivity, or an impulsive behavior, may be broadly defined as actions without foresight that are poorly conceived, prematurely expressed, and inappropriate to the situation. Impulsivity may be associated with undesirable outcomes and may be a salient phenomenon in psychiatric disorders and neurological conditions (e.g., Attention deficit disorder, border line personality disorder, traumatic brain injury, etc.).

Measuring impulsivity may be necessary for determining a diagnosis, prognosis, and/or to tailor a treatment plan. Common methods for assessing impulsivity are subjective questionnaires and objective computerized continuous performance tasks (CPT) as the T.O.V.A (Test of Variables of Attention). A drawback of these methods is that these methods may lack objectivity (questionnaires), sensitivity, and ecological validity (the extent to which the materials and setting of the test approximate to the real-world context that is being examined). While subjective methods as questionnaires may provide clinical value, subjective methods may inherently include bias and may be influenced by various behavioral, sociological, and/or psychological factors, therefore they are not accurate or sensitive enough. Objective CPT measures impulsivity in correspondence with the subject's errors of commission. In CPT, a false positive is when a subject incorrectly responds to a non-target stimulus. For example, a subject may be instructed to click on white squares (i.e., a target stimulus) and not red squares (i.e., a non-target stimulus). In this example, the subject may click on a red square when target stimuli are only white ones. Thus, the CPT method may lead to a large number of false negative results and poor sensitivity (e.g., no indication of impulsivity despite its significant real-world existence). This also may create a condition of low ecological validity of the common CPT. The static, archaic indicators used in the tasks (e.g., pressing a single key on a keyboard repetitively in a quiet room) may not be truly representative of common, everyday tasks. Due to technological limitations in traditional approaches, impulsivity has been measured only indirectly and inaccurately (e.g., by false positive presses). Accordingly, there exists a need for a system that can determine impulsivity directly and accurately in addition to being able to determine false negatives (e.g., where a user makes an impulsive motion but stops prior to clicking a button).

In various embodiments, the systems and methods of the present disclosure allow for the measurement of impulsivity in a realistic and sensitive manner, thereby creating a closer-to-real-life indicator of impulsivity compared to prior impulsivity tests. In various embodiments, the systems and methods of the present disclosure utilize a VR or AR environment to provide an authentic real-life experience visually and/or auditory. In a VR or AR environment, the user can move his or her head and limbs (e.g., arms, hands, legs, feet, etc.) in a naturalistic way while performing one or more tasks. In various embodiments, the systems and methods of the present disclosure further include an eye tracking device used to track the eye motion of the user. In various embodiments, precise measurements of the characteristics of eye and motor movement allow the development of a complex sensitive indicator for impulsivity that can detect minor pre-motor impulsive deficits. In various embodiments, because partial impulsivity is generally a motor movement towards a non-target stimuli, auditory cues may be used in addition to or as a replacement to visual cues. In various embodiments, a visual stimuli may be a lighted button. In various embodiments, an auditory stimuli may be one or more specific auditory target and/or non-target sounds. In various embodiments, the auditory stimuli may be followed by a motor response of a subject as will be described in more detail below. The motor response of the subject may be correct (e.g., towards a non-target stimulus) or incorrect (e.g., towards a target stimulus) with respect to a partial impulsivity measurement.

In various embodiments, the systems and methods of the present disclosure may determine a partial impulsivity of a user of a VR or AR system. In various embodiments, partial impulsivity is defined as an impulsive movement towards a non-target stimulus that does not result in an activation of the non-target stimulus. For example, if a user is instructed to click a button when a white square appears and not to click when a red square appears, and the user makes a motion to click the button when the red square appears but stops prior to activating the button, this instance would be registered as a partially impulsive movement. In various embodiments, determination of partial impulsivity may reduce the number of false negatives in impulsivity testing (e.g., where impulsivity may not be found in a traditional computerized assessment, despite the user experiencing clinical symptoms of impulsivity). In various embodiments, detection of partial impulsivity during cognitive training may be performed in a precise manner despite user adaption to the testing, such as the learning effect, where repetition leads to learning the task and a decrease in impulsive presses. In this example, the decrease in impulsive presses due to the learning effect does not truly represent decrease in user impulsivity, and may lead to a missed diagnosis.

In various embodiments, the VR or AR system may include an eye-tracking device that is configured to determine a eye movements of a user. In various embodiments, the eye-tracking device may detect preliminary eye movements of the user towards a non-target stimulus (e.g., an illuminated target in a particular non-target color) that is provided to the user. In various embodiments, a commercially-available VR eye-tracking system may be used. In various embodiments, the eye-tracking system may be integrated into a headset. Table 1 below lists the data that may be recorded by the eye-tracking system.

TABLE 1

Data recorded by eye-tracking system

| Variable | Description |
| --- | --- |
| Gaze vector (combined for both eyes) | Gaze vectors (Separate left/right) |
| Gaze origin (combined for both eyes) | Single origin of the user's gaze (located between the eyes) |

TABLE 1-continued

Data recorded by eye-tracking system

| Variable | Description |
| --- | --- |
| Foveated Gaze | Eye tracking signal optimized for driving real time foveation applications |
| Blink | True/False signal indicating blinks |
| Convergence (for avatar animation) | Distance from the user at which the gaze is focused at |
| Eye positioning guide | Indicator on the position of the HMD relative to the sweet spot |
| System Timestamp of gaze data | Time stamping according to the system time without drift or latency compensations. Typically accurate to 10-50 ms on a system tethered to a Windows computer |
| Pupil diameter (Separate left/right) | Dynamic pupil size in absolute length units. Optimized for measuring changes in pupil size during one session |
| Position Guide | Quality signal used to measure positioning of HMD on user's head and detect needs of adjustment |
| System and Device Timestamps | Device timestamp is a high precision time stamp, compensated for drift |
| Eye tracking meta data | Meta data about eye tracker hardware, firmware and runtime software versions used for recording the gaze data |

In various embodiments, the eye-tracking device may determine an angle of one or both eyes relative to a reference plane (e.g., a horizontal plane). In various embodiments, the non-target stimulus may be provided at one of a plurality of potential targets or non-targets (e.g., a grid of lights) in the VR or AR environment. For example, one light of a 3×3 grid of lights may be illuminated with a particular color associated with a target or may be illuminated with another color associated with a non-target. In various embodiments, a series of visual stimuli may be provided to the user as a whole or part of a treatment session. In various embodiments, after a non-target stimulus is presented to a user in a VR or AR environment, the eye-tracking device may determine a direction of one or both eyes and determine whether the direction of the eye(s) is towards the stimulus. In various embodiments, the eye-tracking device may include a digital camera. In various embodiments, the system may determine a period of time from when the non-target stimulus is provided to the user in the VR or AR environment to when the user's eyes fixate on the non-target stimulus. In various embodiments, when determining fixation towards the non-target stimulus, the system may determine that the user has fixated on the non-target stimulus for a predetermined amount of time. For example, the predetermined amount of time may be between 1 millisecond and 500 milliseconds. In various embodiments, a minimum threshold of fixation on the non-target stimulus is about 50 milliseconds.

In various embodiments, the VR environment may generate specific attention and/or inhibition tasks. In various embodiments, the attention and/or inhibition tasks may incorporate eye tracking functionality into the determination of partial impulsivity.

In various embodiments, VR or AR displays may be coupled with a variety of motion sensors in order to track a user's motion within a virtual environment. Such motion tracking may be used to navigate within a virtual environment, to manipulate a user's avatar in the virtual environment, or to interact with other objects in the virtual environment. In some devices that integrate a smartphone, head tracking may be provided by sensors integrated in the smartphone, such as an orientation sensor, gyroscope, accelerometer, or geomagnetic field sensor. Sensors may be integrated in a headset, or may be held by a user, or attached to various body parts (e.g., a limb and/or chest) to provide detailed information on user positioning.

In various embodiments, the VR/AR system may determine the position of the body part and record the position over time. In various embodiments, as described in more detail above, one or more sensors may be attached to or otherwise associated with a body part to track a three-dimensional position and motion of the body part with six degrees of freedom. In various embodiments, the system may determine a plurality of positions of one or more body parts. The plurality of positions may correspond to points along a three-dimensional path taken by the body part.

In various embodiments, one or more additional sensors may provide position/motion data of various body parts.

In various embodiments, additional sensors are included to measure characteristics of a subject in addition to motion. For example, cameras and microphones may be included to track speech, eye movement, blinking rate, breathing rate, and facial features. Biometric sensors may be included to measure features such as heart rate (pulse), inhalation and/or exhalation volume, perspiration, eye blinking rate, electrical activity of muscles, electrical activity of the brain or other parts of the central and/or peripheral nervous system, blood pressure, glucose, temperature, galvanic skin response, or any other suitable biometric measurement as is known in the art.

In various embodiments, a user is furnished with a VR or AR system. As noted above, a VR or AR system will generally have integrated motion sensors. In addition, additional motions sensors may be provided, for example to be handheld. This allows tracking of multiple patient attributes while they interact with a scene. In this way, systematic and reproducible scenarios may be used to assess the subject's function.

In various embodiments, the VR or AR system may assess motoric movement towards the non-target. In various embodiments, the VR or AR system may track positional information (e.g., 3D positions) of one or more sensors on the user. For example, the user may be provided with a handheld position tracking sensor in each hand. In various embodiments, the system determines positional information of the position tracking sensors in real time. In various embodiments, the system determines a location of the position tracking sensors when a non-target stimulus is provided to the user. For example, the system may determine the three-dimensional position information of the two handheld sensors when a light is illuminated in a particular color associated with a non-target.

In various embodiments, the VR or AR system may determine acceleration of one or more of the sensors. In various embodiments, the determination of acceleration may be performed in response to a non-target stimulus being provided to the user. In various embodiments, the one or more sensors (e.g., handheld sensors) may include an accelerometer. In various embodiments, the one or more sensors may include a gyroscope. In various embodiments, the one or more sensors may determine a direction of acceleration. In various embodiments, the direction may be represented as a three-dimensional vector. In various embodiments, the VR or AR system may determine a period of time between when the non-target stimulus is provided to the user and when the system detects acceleration towards the non-target.

In various embodiments, the system may filter out sporadic, random or hyperactive movements, or other neurological conditions that are not signifying impulsivity. In various embodiments, training motion data may be gathered of various unwanted motions, such as, for example, natural motion (while performing motor movement), Parkinson's like tremor (at resting state), and/or general background noise (excessive motor movement). In various embodiments, a cognitive system may be trained on the motion data. In various embodiments, the cognitive system may be an supervised learning system. In various embodiments, the cognitive system may be a support vector machine. In various embodiments, the cognitive system may divide the motion data into two segments: partial impulsivity and not partial impulsivity. In various embodiments, a Doppler sensor may be used to verify the speed of movement towards the non-target stimulus.

In various embodiments, a velocity may be determined from a determined acceleration, positional information, and elapsed time to travel between two points in three-dimensional space. In various embodiments, the system may determine accelerations and/or decelerations of the one or more sensors (e.g., handheld sensors).

In various embodiments, the VR or AR system may determine that the initial acceleration towards the non-target is reversed, thereby causing a velocity of the sensor to slow. In various embodiments, the velocity may be slowed to zero. In various embodiments, the velocity may be reversed back towards the user, for example, when the user pulls back their hand after an impulsive movement towards a non-target without making contact with the non-target. In this example, traditional methods of determining impulsivity would not register this impulsive movement (because no target or non-target was activated), while the systems and methods described herein recognize this as a partially-impulsive movement. In various embodiments, the system may determine positional information of the one or more sensors at the instant where the velocity is zero. In various embodiments, the system may determine a period of time between when the first acceleration towards the non-target is determined and when the velocity of the sensor becomes zero. In various embodiments, zero velocity after an impulsive movement (i.e., acceleration) towards a non-target (but before activating or contacting the non-target) represents the end of voluntarily movement towards the non-target.

In various embodiments, the VR or AR system may determine an impulsivity score based on the period of time from when the non-target visual stimulus is provided to the user to when the user fixates on the non-target, a total fixation time on the non-target, a total number of impulsive movements during a session, a period of time from when the non-target visual stimulus is provided to when the initial acceleration towards the non-target is detected, and a period of time from when the initial acceleration is determined to when the velocity of the particular accelerating body part stops (prior to activating the non-target). In various embodiments, the impulsivity score may be based on one or more velocity measures, azimuth toward the target, and/or distance of movement. In various embodiments, the azimuth may be used to distinguish between partial impulsivity and other unwanted motion (e.g., natural tremor).

In various embodiments, total fixation time is the total amount of time one or more eyes (e.g., both eyes) are fixated on the non-target stimulus until the time when the impulsive movement stops (i.e., a stop time). In various embodiments, the total fixation time may include any time caused by natural saccade between any two fixation periods. For example, if the eye tracking system detects fixation-saccade-fixation, the total fixation time may be the sum of time for each of the first fixation period, the saccade period, and the second fixation period. In various embodiments, a timer may begin at the appearance of the target stimulus until first fixation on the non-target stimulus is detected by the eye tracking system.

In various embodiments, each partially impulsive movement may be determined. In various embodiments, the partially impulsive movements may be counted to determine a total number of partially impulsive movements. In various embodiments, hitting the non-target (referred to as impulsivity) may be recorded. In various embodiments, each hit of a non-target may be reported (e.g., to a healthcare provider via an EMR). In various embodiments, the total number of partially impulsive movements may be recorded and/or reported.

In various embodiments, a partial impulsivity score may be determining based on the total number of partially impulsive movements. In various embodiments, the partial impulsivity score may consist of the total number of partial impulsivity per session. In various embodiments, the partial impulsivity score may incorporate eye-tracking parameters (e.g., fixation, blinks, saccades, pupil dilation). In various embodiments, the partial impulsivity score may be normalized according to the number of total hits in the game. In various embodiments, the total hits in a game may include total hits on a target and/or total hits on a non-target. In various embodiments, a normalized partial impulsivity score may enable a healthcare provider to establish a clinically viable new indicator that is meaningful for patient rehabilitation.

In various embodiments, partially impulsivity score may be determined based on the output from one or more sensors beginning from the moment a stimulus is shown (e.g., a light turns on) to the moment the stimulus is removed (e.g., the light turns off). In various embodiments, each output from the one or more sensors may be extracted as a time series of data. In various embodiments, the time series of data may be smoothed using, for example, a smoothing filter. In various embodiments, the time series of data may be processed using one or more other suitable filters (e.g., a high-pass filter, a low-pass filter, a band-pass filter, a Kalman filter, etc.). In various embodiments, the time series of data may include one or more of: a distance to target, an absolute-velocity, an acceleration, a Doppler (range'), a Doppler-diff (range"), a Doppler/absolute-velocity ratio, and/or a Doppler-diff/acceleration ratio. In various embodiments, features may be extracted from one or more of the time series. For example, features extracted from time series of data may include at least one of: minimum Doppler normalized by maximum absolute Doppler, maximum Doppler normalized by maximum absolute Doppler, minimum peak of Doppler/absolute-velocity ratio at a time window before minimum Doppler, maximum peak of Doppler/absolute-velocity ratio at a time window before maximum Doppler, minimum peak of Doppler-diff/acceleration ratio at a time window before minimum Doppler, maximum peak of Doppler-diff/acceleration ratio at a time window before maximum Doppler, time delta between Doppler peaks (time of maximum Doppler minus time of minimum Doppler), integral of absolute velocity normalized by total time period, and/or maximum absolute Doppler. In various embodiments, a machine learning model may be trained on normal and edge cases to obtain features for prediction of partial impulsivity. In various embodiments, the machine learning model may predicts if a partial impulsivity occurred and, if so, may calculate a start response time (RT), a stop RT, and the distance travelled.

In various embodiments, partial impulsivity may be determined as the time between the identification of the reaction time (i.e., a start time) until a time when the user starts to decrease speed towards the non-target stimulus (i.e., a stop time). In various embodiments, the stop time corresponds to a negative peak from a Doppler sensor.

Figure 1:
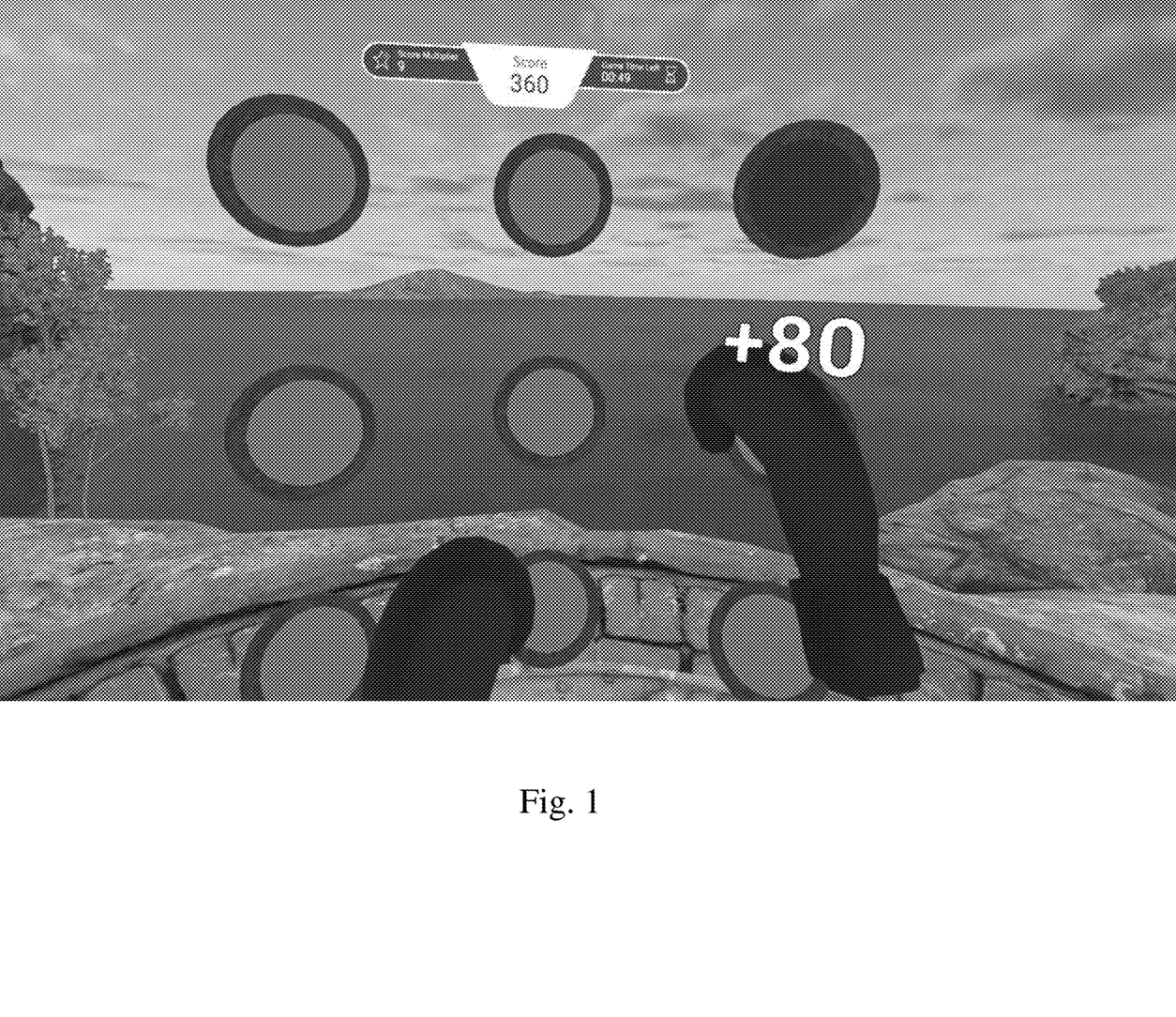
FIG. 1 illustrates an exemplary virtual reality environment for determining partial impulsivity in accordance with an embodiment of the present disclosure.

FIG. 1 illustrates an exemplary virtual reality environment for determining partial impulsivity. In particular, FIG. 1 shows a user having two gloves, where the position of each glove is directed by handheld sensors. The user is instructed to press only buttons illuminated with a particular color (e.g., blue buttons), which represent a target stimulus. Any buttons illuminated with another color represent a non-target stimulus. In various embodiments, an impulsive movement towards a non-target stimulus may be characterized as partial impulsivity if the action ends without pressing the non-target button. In various embodiments, an impulsive movement towards a non-target stimulus may be characterized as a commission if the non-target button is activated (e.g., pressed).

Figure 2:
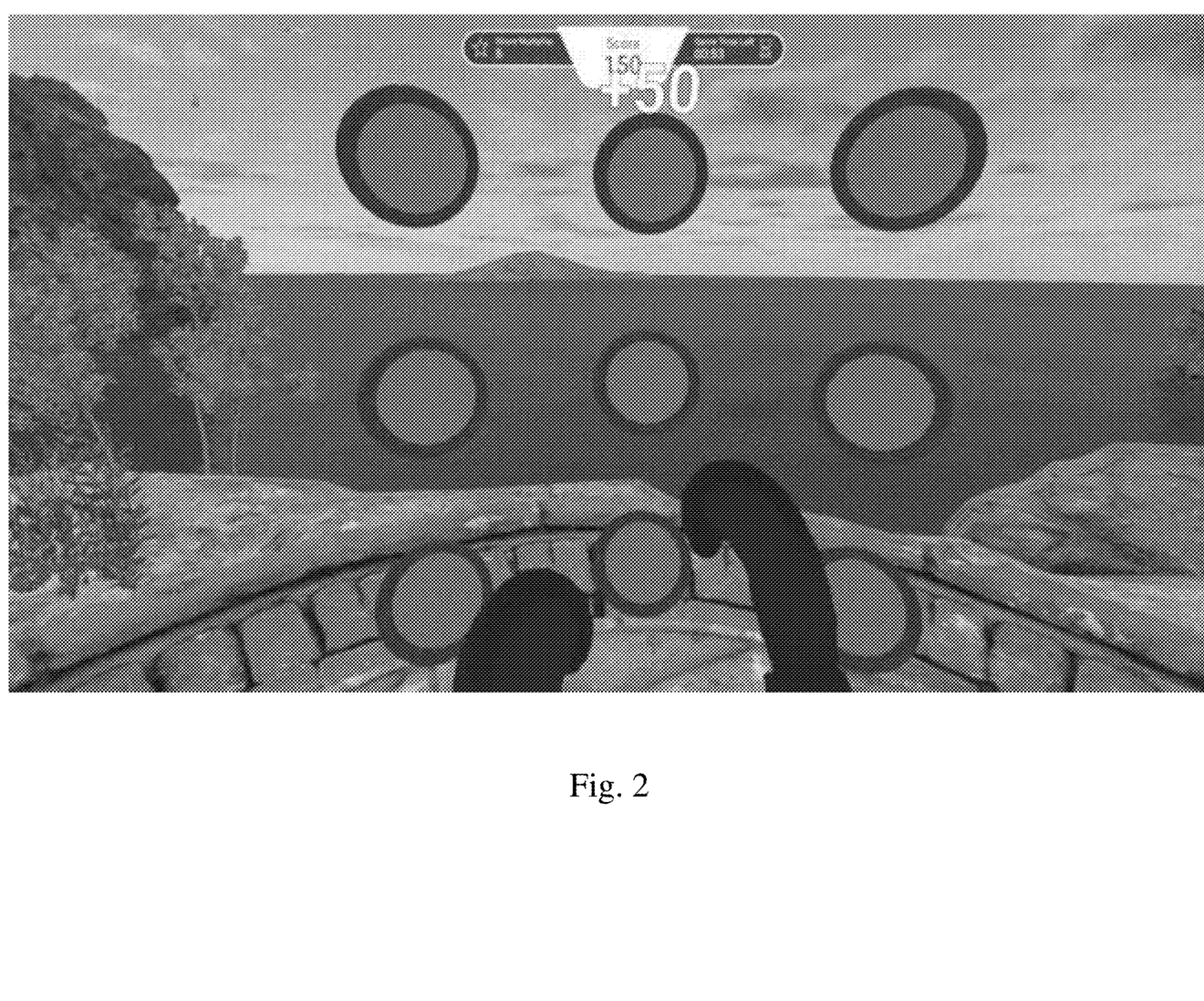
FIG. 2 an exemplary virtual reality environment for determining partial impulsivity in accordance with an embodiment of the present disclosure.

FIG. 2 an exemplary virtual reality environment for determining partial impulsivity in where a user has scored points. In various embodiments, the points are awarded for a successful hit (e.g., hitting a button).

Figure 3:
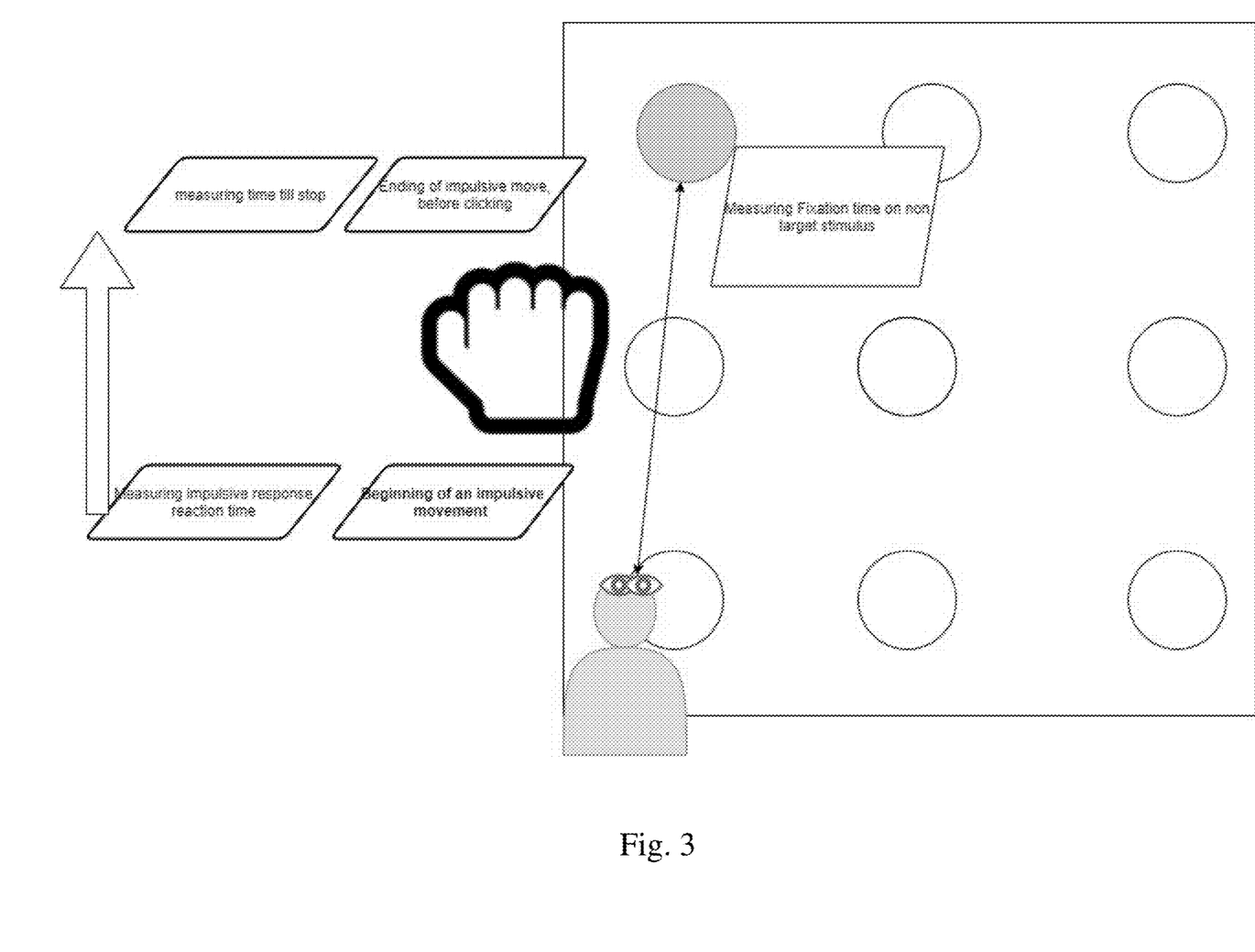
FIG. 3 illustrates an exemplary system diagram of a partial impulsivity assessment system in accordance with an embodiment of the present disclosure.

FIG. 3 illustrates an exemplary system diagram of a partial impulsivity assessment system. In particular, a non-target stimulus is provided to the user (e.g., a red circle in the grid of non-illuminated circles). The system measures fixation time of the user's eyes on the non-target stimulus. The system detects the beginning of an impulsive movement and measures the impulsive response reaction time, which is the time it takes for the user to begin the impulsive movement after presentation of the non-target stimulus. The system detects the end of an impulsive movement (e.g., when velocity becomes zero) prior to activating the non-target red button and measures the time that the user takes to stop the impulsive movement.

In various embodiments, the system may distinguish reactive eye movement from random movement, such as saccade. In various embodiments fixation time on the non-target stimulus may be used as a predictor of the impulsive movement. In various embodiments, a fixation is the period of time where the eye is kept aligned with the target for a predetermined duration. In various embodiments, the fixed duration may allow for the non-target stimulus to be processed in the mind of the user. Saccades are the type of eye movement where the fovea moves rapidly from one point of interest to another. In various embodiments discriminating between fixation and saccades may be performed using any suitable methods as are known in the art. In various embodiments, a velocity-based algorithm may be used for discriminating saccades from fixation. In various embodiments, a velocity-based discrimination algorithm may increase weighting of one or more eye-velocity variables and/or decrease weighting of other non-eye-velocity variables in the eye-tracking algorithm, thus taking advantage of the fact that fixation points have low velocities and saccade points have high velocities.

In various embodiments, the fixation time on the non-target may be used to predict inhibition. In various embodiments, the saccade latency towards the non-target, blinks, and pupil diameter may be related to planning a future motor movement. In various embodiments, the system may detect saccade latency, blinking, and/or pupil diameter as a predictor of a future movement. In various embodiments, pupil diameter may be used as a marker of cognitive states in humans. In various embodiments, pupil diameter may reflect the activity of an arousal network related to the norepinephrine system. In various embodiments, pupil diameter may be decreased in ADHD subjects while performing executive function cognitive tasks. Therefore, in some embodiments, pupil diameter may serve as preliminary indicator for impulsivity that is considered to be regulated by the attentional and executive control networks. In various embodiments, the maximum pupil diameter measured after stimulus presentation may be inversely associated to the variability in the subject's reaction time. In various embodiments, maximum pupil diameter may be directly associated with the subjects' performance in the task, indicating that pupil size during the crucial part of the task was associated with the subjects' outcome. In various embodiments, subject performance may be inversely associated with the variability in reaction time.

In various embodiments, blinking may be used as a marker of cognitive states in humans. In various embodiments, subjects having ADHD may have difficulties in suppressing eye blinks while anticipating visual stimuli. This inability to suppress blinking observed in subjects having ADHD may be caused by the fact that they fail to maintain sufficient levels of arousal during a simple and prolonged task. In various embodiments, low level of arousal is accompanied with impulsivity and, therefore, blinks may reflect an upcoming impulsive act.

In various embodiments, the user's impulsivity scores may be stored at a remote server. For example, the impulsivity scores may be stored in an electronic health record (EHR) server having an EHR specific to the user. In various embodiments, impulsivity scores from subsequent user sessions may be compared against impulsivity scores from previous user sessions. In various embodiments, a user may establish a baseline impulsivity score to which future impulsivity scores will be compared. In various embodiments, normative values for impulsivity score may be generated, for example, by massive data collection from healthy subjects.

In various embodiments, the VR or AR systems described herein may be used in ADHD assessment and/or cognitive treatment. In various embodiments, a patient may utilize the system to practice inhibition against impulsive action towards a non-target stimulus. In various embodiments, a healthcare professional may be provided access to user data for the system (e.g., an EHR for the user) to thereby follow the user improvement throughout cognitive treatment. In various embodiments, a healthcare professional or a user may set treatment goals, for example a decrease in the number of partial impulsivity errors over a number of sessions.

Figure 4:
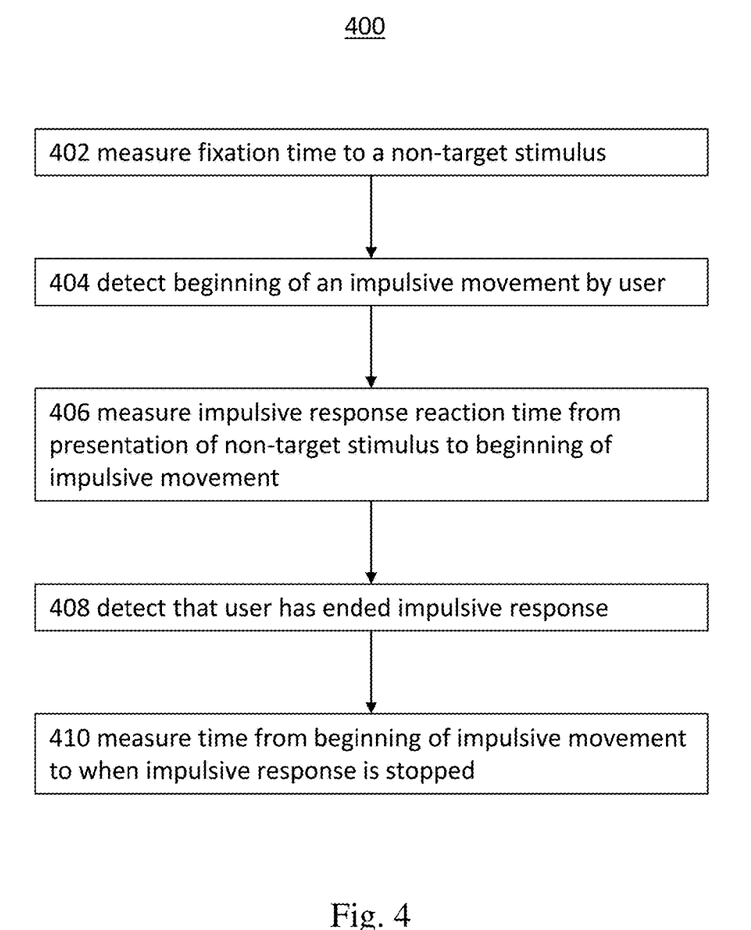
FIG. 4 shows a flowchart of a method of determining partial impulsivity in accordance with an embodiment of the present disclosure.

FIG. 4 shows a flowchart of a method 400 of determining partial impulsivity. At 402, a fixation time to a non-target stimulus is measured. At 404, the beginning of an impulsive movement of a user is detected. At 406, an impulsive response reaction time is measured. At 408, the system detects that the user has ended the impulsive response. At 410, a time is determined from the beginning of impulsive response to when the impulsive response is stopped.

Figure 5:
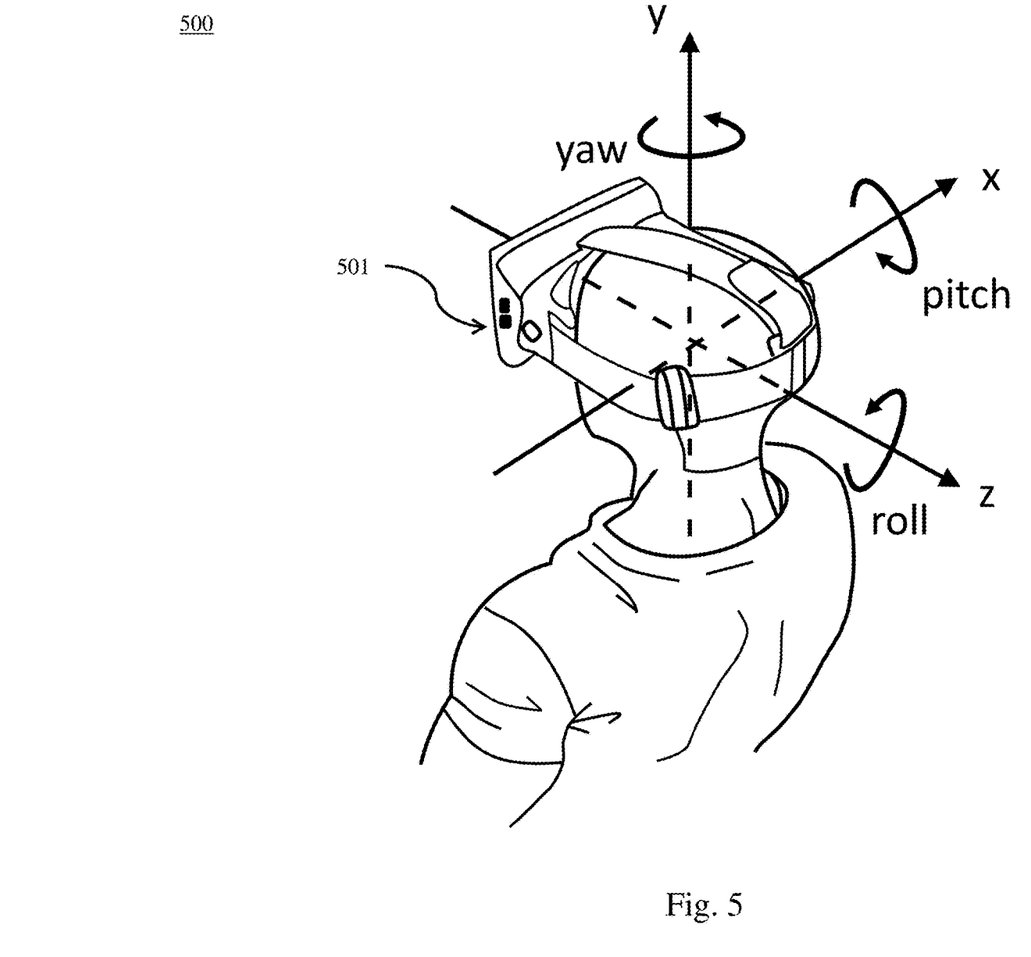
FIG. 5 illustrates an exemplary virtual reality headset according to embodiments of the present disclosure.

With reference now to FIG. 5, an exemplary virtual reality headset is illustrated according to embodiments of the present disclosure. In various embodiments, system 500 is used to collected data from motion sensors including hand sensors (not pictured), sensors included in headset 501, and additional sensors such as sensors placed on the body (e.g., torso, limbs, etc.) or a stereo camera. In some embodiments, data from these sensors is collected at a rate of up to about 150 Hz. As illustrated, data may be collected in six degrees of freedom: X—left/right; Y—up/down/height; Z—foreword/backward; P—pitch; R—roll; Y—yaw. As set out herein, this data may be used to track a user's overall motion to facilitate interaction with a virtual environment and to evaluate their performance. Pitch/Roll/Yaw may be calculated in Euler angles.

In various embodiments, off the shelf VR systems are optionally used with additional external compatible sensors to track various elements in multiple fields including, e.g., motion tracking, cognitive challenges, speech recognition, stability, facial expression recognition, and biofeedback.

Motion tracking can include, but is not limited to tracking of gait, stability, tremors, amplitude of motion, speed of motion, range of motion, and movement analysis (smoothness, rigidity, etc.).

A Picture Archiving and Communication System (PACS) is a medical imaging system that provides storage and access to images from multiple modalities. In many healthcare environments, electronic images and reports are transmitted digitally via PACS, thus eliminating the need to manually file, retrieve, or transport film jackets. A standard format for PACS image storage and transfer is DICOM (Digital Imaging and Communications in Medicine). Non-image data, such as scanned documents, may be incorporated using various standard formats such as PDF (Portable Document Format) encapsulated in DICOM.

An electronic health record (EHR), or electronic medical record (EMR), may refer to the systematized collection of patient and population electronically-stored health information in a digital format. These records can be shared across different health care settings. Records may be shared through network-connected, enterprise-wide information systems or other information networks and exchanges. EHRs may include a range of data, including demographics, medical history, medication and allergies, immunization status, laboratory test results, radiology images, vital signs, personal statistics like age and weight, and billing information.

EHR systems may be designed to store data and capture the state of a patient across time. In this way, the need to track down a patient's previous paper medical records is eliminated. In addition, an EHR system may assist in ensuring that data is accurate and legible. It may reduce risk of data replication as the data is centralized. Due to the digital information being searchable, EMRs may be more effective when extracting medical data for the examination of possible trends and long term changes in a patient. Population-based studies of medical records may also be facilitated by the widespread adoption of EHRs and EMRs.

Health Level-7 or HL7 refers to a set of international standards for transfer of clinical and administrative data between software applications used by various healthcare providers. These standards focus on the application layer, which is layer 7 in the OSI model. Hospitals and other healthcare provider organizations may have many different computer systems used for everything from billing records to patient tracking. Ideally, all of these systems may communicate with each other when they receive new information or when they wish to retrieve information, but adoption of such approaches is not widespread. These data standards are meant to allow healthcare organizations to easily share clinical information. This ability to exchange information may help to minimize variability in medical care and the tendency for medical care to be geographically isolated.

In various systems, connections between a Picture Archiving and Communication System (PACS), Electronic Medical Record (EMR), Hospital Information System (HIS), Radiology Information System (RIS), or report repository are provided. In this way, records and reports form the EMR may be ingested for analysis. For example, in addition to ingesting and storing HL7 orders and results messages, ADT messages may be used, or an EMR, RIS, or report repository may be queried directly via product specific mechanisms. Such mechanisms include Fast Health Interoperability Resources (FHIR) for relevant clinical information. Clinical data may also be obtained via receipt of various HL7 CDA documents such as a Continuity of Care Document (CCD). Various additional proprietary or site-customized query methods may also be employed in addition to the standard methods.

Figure 6:
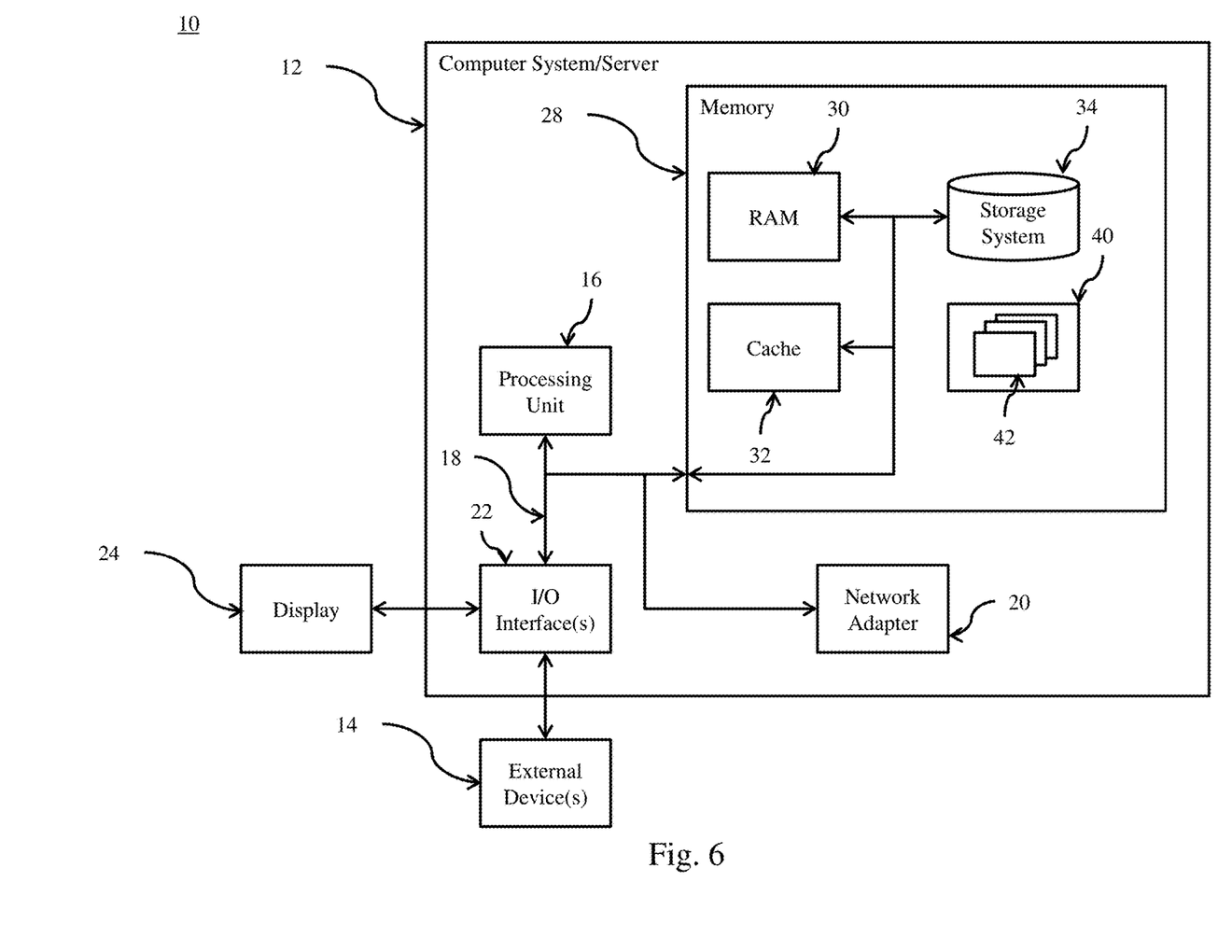
FIG. 6 depicts a computing node according to an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing a virtual environment to a first user via a virtual or augmented reality system, the virtual environment comprising a plurality of targets;
providing a plurality of visual stimuli at one of the plurality of targets, the plurality of visual stimuli being provided sequentially and collectively defining a session;
for each of the plurality of visual stimuli:
determining a first period of time from when a first visual stimulus is provided to when the user fixates one or both eyes on the one of the plurality of targets having the first visual stimulus;
detecting a first acceleration occurrence of a first acceleration of a body part of the user, the first acceleration causing a velocity of the body part to increase in a direction of the one of the plurality of targets;
determining a second period of time from when the first visual stimulus is provided to when the first acceleration is determined;
detecting a second acceleration occurrence of a second acceleration of the body part, the second acceleration causing the velocity of the body part to decrease to zero prior to contacting the one of the plurality of targets;
determining a third period of time from when the first acceleration is determined to when the velocity of the body part is zero; and
determining a total fixation time on the one of the plurality of targets after the first visual stimulus is provided;
determining a total number of impulsive movements in the session; and
determining an impulsivity score based on the first period of time, the total fixation time, the total number of impulsive movements, the second period of time, and the third period of time.

2. The method of claim 1, further comprising determining whether a motion of the one or both eyes is a saccadic motion.

3. The method of claim 2, wherein the determining whether the motion of the one or both eyes is the saccadic motion comprises determining whether the one or both eyes are fixated for a predetermined length of time.

4. The method of claim 1, wherein the body part comprises a hand of the user.

5. The method of claim 1, further comprising:
determining a first location of the body part when the first visual stimulus is provided;
determining a second location corresponding to when the body part reaches a zero velocity.

6. The method of claim 5, further comprising determining a distance traveled for the body part between the first location and the second location.

7. The method of claim 6, further comprising determining an average velocity based on the distance traveled and the third period of time.

8. The method of claim 6, further comprising determining an azimuth toward the target when the first acceleration is determined.

9. A system comprising:
a virtual or augmented reality system comprising a virtual or augmented reality display adapted to display a virtual environment to a user;
an eye tracking device;
a computing node comprising a computer readable storage medium having program instructions embodied therewith, the program instructions executable by a processor of the computing node to cause the processor to perform a method comprising:
  providing the virtual environment to a first the user via the virtual or augmented reality system, the virtual environment comprising a plurality of targets;
  providing a plurality of visual stimuli at one of the plurality of targets, the plurality of visual stimuli being provided sequentially and collectively defining a session;
  for each of the plurality of visual stimuli:
    determining a first period of time from when a first visual stimulus is provided to when the user fixates one or both eyes on one of the plurality of targets having the first visual stimulus;
    detecting a first acceleration occurrence of a first acceleration of a body part of the user, the first acceleration causing a velocity of the body part to increase in a direction of the one of the plurality of targets;
    determining a second period of time from when the first visual stimulus is provided to when the first acceleration is determined;
    detecting a second acceleration occurrence of a second acceleration of the body part, the second acceleration causing the velocity of the body part to decrease to zero prior to contacting the one of the plurality of targets;
    determining a third period of time from when the first acceleration is determined to when the velocity of the body part is zero; and
    determining a total fixation time on the one of the plurality of targets after the first visual stimulus is provided;
  determining a total number of impulsive movements in the session; and
  determining an impulsivity score based on the first period of time, the total fixation time, the total number of impulsive movements, the second period of time, and the third period of time.

10. A computer program product for determining partial impulsivity of a user, the computer program product comprising a computer readable storage medium having program instructions embodied therewith, the program instructions executable by a processor to cause the processor to perform a method comprising:
  providing a virtual environment to the user via a virtual or augmented reality system, the virtual environment comprising a plurality of targets;
  providing a plurality of visual stimuli at one of the plurality of targets, the plurality of visual stimuli being provided sequentially and collectively defining a session;
  for each of the plurality of visual stimuli:
    determining a first period of time from when a first visual stimulus is provided to when the user fixates one or both eyes on the one of the plurality of targets having the first visual stimulus;
    detecting a first acceleration occurrence of a first acceleration of a body part of the user, the first acceleration causing a velocity of the body part to increase in a direction of the one of the plurality of targets;
    determining a second period of time from when the first visual stimulus is provided to when the first acceleration is determined;
    detecting a second acceleration occurrence of a second acceleration of the body part, the second acceleration causing the velocity of the body part to decrease to zero prior to contacting the one of the plurality of targets;
    determining a third period of time from when the first acceleration is determined to when the velocity of the body part is zero; and
    determining a total fixation time on the one of the plurality of targets after the first visual stimulus is provided;
  determining a total number of impulsive movements in the session; and
  determining an impulsivity score based on the first period of time, the total fixation time, the total number of impulsive movements, the second period of time, and the third period of time.

* * * * *